United States Patent [19]

Holmes et al.

[11] 4,275,572

[45] Jun. 30, 1981

[54] TORQUE LIMITING DRIVE SYSTEM

[76] Inventors: Phillip R. Holmes, 1125 S. LeRoy, Fenton, Mich. 48430; James A. Kehler, 11241 Fernitz, Byron, Mich. 48418; Ronald A. Bogusky, 12364 Erica, Hartland, Mich. 48029

[21] Appl. No.: 2,401

[22] Filed: Jan. 10, 1979

Related U.S. Application Data

[63] Continuation-in-part of Ser. No. 833,723, Sep. 16, 1977, abandoned.

[51] Int. Cl.³ .................... F16D 7/02; B65G 13/06
[52] U.S. Cl. ............................ 64/30 D; 64/11 R; 64/27 NM; 198/781
[58] Field of Search ............ 64/30 R, 30 D, 30 C, 64/30 E, 27 NM, 27 R, 29, 11 R; 198/781

[56] References Cited

U.S. PATENT DOCUMENTS

| | | | |
|---|---|---|---|
| 1,144,067 | 6/1915 | Rundlöf | 64/30 D |
| 1,590,055 | 6/1926 | Porter | 64/30 R |
| 3,007,652 | 11/1961 | Heckman | 64/30 R |
| 3,204,430 | 9/1965 | Smirl | 64/28 R |
| 3,942,338 | 3/1976 | Furlette et al. | 64/30 D |
| 4,056,953 | 11/1977 | Furlette et al. | 64/30 D |
| 4,143,525 | 3/1979 | Major | 64/30 D |

*Primary Examiner*—Ira S. Lazarus
*Assistant Examiner*—Magdalen Moy
*Attorney, Agent, or Firm*—Harry R. Dumont

[57] ABSTRACT

A system for transmitting torque to a driven member from a drive shaft extending axially throughout the driven member which is itself of a tubular shape. The drive shaft is of a circular cylindrical configuration and at least one resilient spherical drive element is used to transmit torque between the drive shaft and the driven tubular member. The diameter of the resilient member is somewhat greater than the distance between the opposed surfaces of the drive shaft and the driven tubular member. A means is included on either or both the drive shaft and tubular member to retain the resilient member in a substantially fixed orbiting path and to retain it against longitudinal movement along the surfaces of the drive shaft and the driven tubular member.

2 Claims, 7 Drawing Figures

TORQUE LIMITING DRIVE SYSTEM

CROSS REFERENCE TO RELATED APPLICATION

The present invention is a continuation-in-part of our co-pending U.S. Patent Application Ser. No. 833,723 filed Sept. 16, 1977 now abandoned.

BACKGROUND OF THE INVENTION

The present invention relates to a system which transmits torque from a drive shaft to a tubular member that has the capability of preventing excessive torque being applied, particularly when the driven mechanism becomes frozen due to mechanical failure, overload, or the like. The present application is particularly suitable for incorporation in a drive system for a conveyor roller with an input or inputs being received from a motor driven motor or drive shaft. It will be understood that in the typical conveyor system, one or more of the rollers is power driven while the remainder are free rolling. Whenever the articles being carried by the conveyor become jammed or overloaded, time must be allowed for the operator to relieve the jammed condition without forcing a continuing drive to the conveyor in such manner as to injure the articles or destroy the drive mechanism itself. The prior art shows a number of torque limiting clutches and the like. These generally require rather complex and costly mechanisms and they are not easily adjustable to selectively vary the drive torque in accordance with the load to which the conveyor may be subjected.

Another approach that has been made to provide a torque limiting coupling is exemplified by U.S. Pat. No. 3,942,338, issued of Furlette, et al on Mar. 9, 1976 for "Torque Limiting Coupling". The combination taught by that patent is that of a drive shaft and a hollow, tubular driven member in which the torque communicating element between the tube comprises a hollow, elongated sleeve. That system is subject to a number of disadvantages, particularly that in use the elongated sleeve becomes distorted out of parallelism with the driven shaft so that a binding and non-uniform transmission of torque results. Also, the provision of the hollow driven element leads to excessive distortion in shape of the drive element each time a raised edge of the drive shaft is encountered in its rotation. The system disclosed by that patent is thus one that is incapable of providing smooth and predictable torque transmission and is further one that is not readily adjustable by the addition or removal of a number of drive elements.

A still further approach is shown by U.S. Pat. No. 4,056,953 issued to Furlette, et al on Nov. 8, 1977 for "Torque Limiting Coupling". The combination taught by that patent is one similar to that described in connection with U.S. Pat. No. 3,942,338 of which it is a continuation-in-part. However, the elements for transmitting the torque between drive shaft and hollow, tubular driven member are a plurality of resilient, spherical, members which are loosely disposed along the length of the driving shaft. As is shown by the several drawings, the plurality of spherical elements tend to walk up and down the shaft longitudinally in such way that they come to interact one with the other. Thus, the balls begin to co-act because they are made of a softer material in the shaft. They act in a similar manner to gears and when they apply pressure one against the other, they tend to turn in opposite directions. The net effect of this is to cause rotation of the tubular element in exactly the opposite direction in which it really was intended to turn.

Another patent in which the clutch elements or torque communicating elements are hollow tubes is exemplified by U.S. Pat. No. 3,007,652, issued to Hechtman on Nov. 7, 1961 for "Paper Roll Mounting Mechanism".

The present invention provides an exceedingly simple but effective torque limiting drive system which automatically prevents damage in the event of jam of parts carried by the conveyor. It is possible to vary the drive force being applied by adding one or more spherical drive elements or by varying the hardness of a single drive element being used in the system. Of these two approaches, adding additional elements is the preferable one. A further advantage of the present invention is that in the addition of extra spherical members, they are spaced one from the other and retained by a specialized structure which keeps them in a regular predetermined orbiting type path around the driving shaft.

SUMMARY OF THE INVENTION

The several advantages of the present invention are derived by providing a simplified torque limiting drive system in which both the driving shaft and driven tubular member have opposed cylindrical surfaces. One or more spherical resilient elements are contained intermediate the drive shaft and opposed inner surface of the tubular member so that the spherical element or elements act as a resilient wedge type element transmitting the rotation from the shaft to the tubular member in accordance with the continued rotation of the drive means. By the use of a spherical drive element on the round shaft as compared to other configuration shafts, it is possible to maintain a lighter load, eliminate pulsations, provide a constant drive, lower the back pressure and greatly enlarge the range of drive forces available. The light load can be accomplished by compressing the ball between the shaft and the tubing I.D. to a lesser degree than would occur if the drive shaft were of a polygonal peripheral configuration.

A major problem encountered in the use of polygonal configuration drive shaft is that every time the spherical drive member goes over a sharp point or peak of the surface, there is pulsation motion provided. Each time the pulsation occurs, it is transferred directly to the tubular member. This results in a jerking motion causing the parts on the conveyor to hit each other and in some cases, causing damage to them. With the use of lighter weight parts, it is not possible to maintain a light load continuously, and each time a sharp point or corner of the drive shaft is encountered, the pulsation causes the roller to turn a few degrees and therefor, abrasive wear can result on the parts.

With respect to the present invention, the spherical drive member has a constant low pressure drive so that the drive continues until the part comes to a stop. At that time the roller stops and a continued jerking motion is not present. It is understood that the pulsation amplitude could be decreased by introducing more points, but this, at the same time, would increase the number of pulsations which would still result in banging together of the parts on the conveyor.

A further disadvantage of the prior art devices with polygonal configurations drive shafts is that the back pressure communicated on to the parts varies considerably between when the spherical drive element is on the flat of the drive shaft and little back pressure results and the time when the spherical drive member climbs over the edge when a tremendous back pressure results causing the parts to tend to shingle and to try to drive on ahead.

A still further advantage of this invention is that the range in load of parts of a conveyor can be far greater and more readily adjustable.

BRIEF DESCRIPTION OF THE DRAWINGS

The several advantages and objects of the present invention will be apparent when the specification is read in conjunction with the accompanying drawings wherein like numerals refer to like parts in the several views and wherein:

FIGS. 1 and 2 illustrate a drive belt 24 from which a regular rotative drive is communicated to the system from a drive motor, not shown. Also shown in dash outline in FIG. 1 is a spherical drive element 30 used as the drive element to transmit drive portions between the drive shaft 14 and the tubular member 10. The spherical drive member 30 is preferably formed from a solid urethane material with a hardness measured on the durometer A scale ranging between 40-100. The dimension of the spherical drive element 30 is important to the invention. The diameter of the spherical drive member 30 is slightly greater than the distance between the internal surface of the tubular member and the outer diameter of the drive shaft 14. In its slightly compressed state, each spherical drive member 30 is guided and confined in its path around drive shaft 14 by its circumferential grooves 14a.

FIGS. 3 and 4 illustrate the condition in which the spherical drive member 30 is slightly compressed in its position between the opposed cylindrical surfaces of the tubular member 10 and the drive shaft 14. The drive shaft 14 is here rotated in a counterclockwise direction and normally imparts a rotative drive to the tubular member 10 in the same direction. This rotation of the tubular member 10 will continue as long as the torque required for driving the tubular member 10 does not exceed a predetermined value as preset by one or a plurality of spherical drive members 30. The actual drive force between the drive shaft 14 and the tubular member 10 is provided by the spherical element being placed in compression between the two. However, as soon as the load on the tubular member 10 becomes excessive, such as will be the case in the event a jam occurs on the conveyor system transporting articles, or, in the event that something physically impedes the rotation of the tubular member 10, the spherical element 30 is caused to rotate and literally walk around the internal surface of the tubular member 10 without, however, imparting an effective force of rotation to it. Under a completely stalled condition in which the tubular member 10 is stopped from rotating, the drive shaft 14 continues to rotate by being driven by its drive mechanism and the spherical element 30 will roll around its own axis inside the tubular member 10 in a counterclockwise direction as shown in FIGS. 3, 3A and 3B. As soon as the jam is cleared and the tubular member 10 is again free to rotate, the effective resilient action of the spherical element 30 is re-established and the tubular member 10 once again is operatively coupled to the drive shaft 14 and the drive of the tubular member 10 is resumed.

Figure 1:
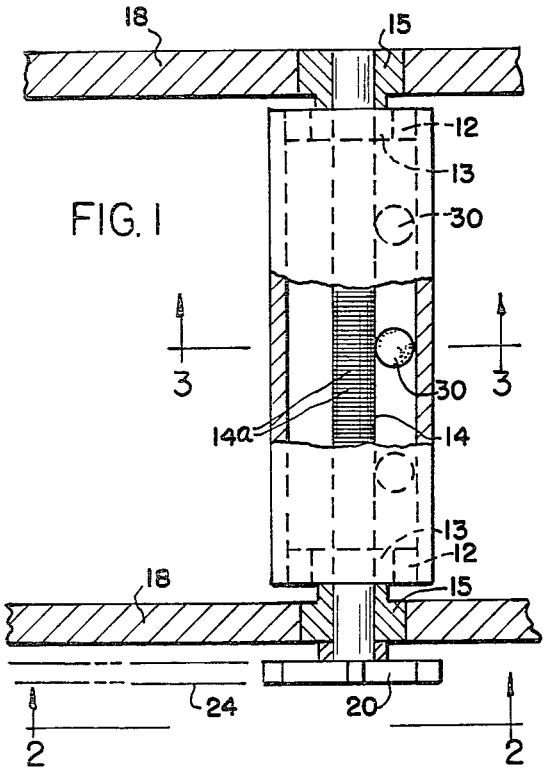
FIG. 1 is a top plan view partly in section showing the present invention and its incorporation in conveyor drive system.
Figure 3:
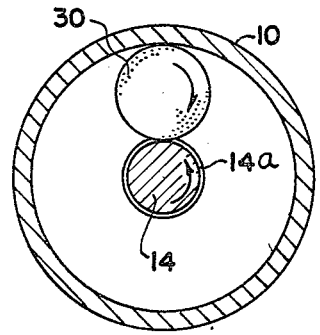
FIGS. 3, 3A and 3B are sectional views taken along the line 3—3 of FIG. 1 at different times.
Figure 3A:
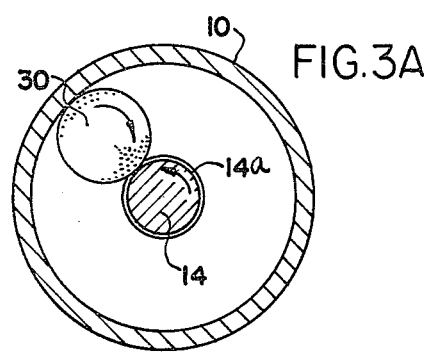
Figure 2:
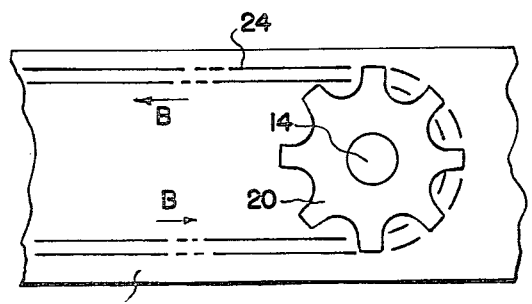
FIG. 2 is a side elevational view of the apparatus of FIG. 1.
Figure 3B:
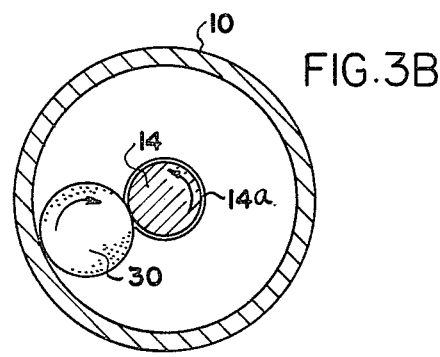
Figure 4:
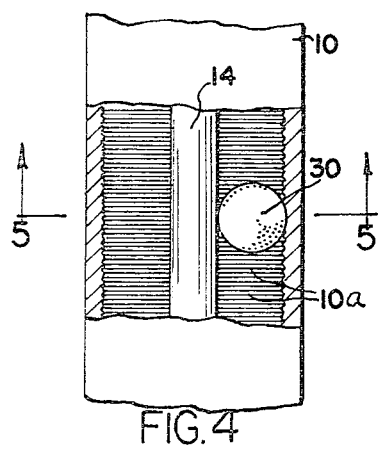
FIG. 4 is a top plan view with parts broken away showing further detail of a different embodiment of the apparatus.
Figure 5:
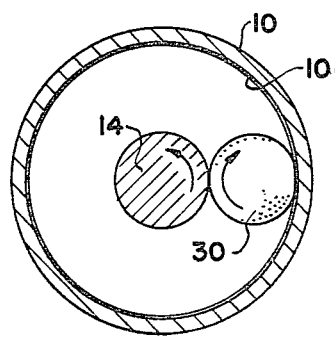
FIG. 5 is a sectional view taken along the line 5—5 of FIG. 4. DETAILED DESCRIPTION OF THE PREFERRED EMBODIMENT Referring now to the drawings, and more particularly to FIGS. 1 and 2, the invention is shown in a torque limiting drive system for a tubular member such as a conveyor drive roller. The roller is incorporated as a tubular member 10 supported at each end by an outer bearing 12. The bearings 12 operate functionally as the outer race for a mating inner bearing 13. Each bearing 13 is fastened to a different end of a drive shaft 14. It will thus be seen that the tubular member 10 is free to rotate in either direction independently of the drive shaft 14. It will be understood that a typical conveyor system may have a plurality of drive members 30 for each tubular member 10. In a complete conveyor system there would be a number of spaced idler rollers also provided to support the articles carries. The side portions of the conveyor frame are denoted by the numeral 18. The respective cylindrical ends of the drive shaft 14 are rotatably supported between the side portions 18 by the bearings 13 and 15, respectively. At the end of the drive shaft 14, there is shown the means for receiving a rotative drive which comprises a drive sprocket 20. The drive sprocket 20 is fixed to the end 22 of the drive shaft 14 proximate bearing 15. A plurality of circumferential grooves 14a are formed along the length of the drive shaft 14. This grooved portion of the shaft 14 operates to maintain the several drive members 30 in a relatively fixed path orbiting about the inside of the tubular members 10.

The torque to be transmitted by the drive system can be simply and selectively varied by adding additional spherical elements 30 along the length of the shaft 14. The circumferential grooves 14a or 10a formed in the parts as shown in FIGS. 1 and 4 operated to maintain each of the spherical elements in its own path, separated from the others.

It will be appreciated by those skilled in the art that the torque limiting function of the invention has numerous applications other than the specific one disclosed in the preferred embodiment for a conveyor roller drive.

We claim:

1. A torque limiting drive system for driving a tubular driven member by a drive shaft, said system comprising means for supporting the drive shaft in a rotative condition;

means for imparting a rotative drive to the drive shaft;

said drive shaft having a portion of circular cross-sectional configuration contained within said tubular driven member;

said tubular driven member having a relatively smooth inner surface;

a spherical drive element mounted intermediate the inner surface of the tubular driven member and said portion of said drive shaft;

said spherical drive element having a diametrical dimension greater than the distance between one of the opposed surfaces of the circular portion of the drive shaft and the opposed inner surface of the tubular member; and means comprising a plurality of grooves extending about the periphery of said shaft and orthogonal to its axis for retaining said drive element in a relatively stable orbiting path, said grooves of a magnitude many times smaller than the diameter of said drive element; said grooves extending along substantially the entire length of said shaft.

2. A torque limiting drive system for rotating a tubular driven member by a drive shaft, said system comprising means for rotatably supporting said drive shaft;

means for imparting a rotative drive to said drive shaft;

said drive shaft having a portion of circular cross-sectional configuration and of smooth surface finish contained within said tubular driven member;

means for rotatably mounting said tubular driven member about said drive shaft portion;

a plurality of spherical drive elements spaced one from the other and mounted intermediate the inner surface of the tubular driven member and said portion of said drive shaft;

said spherical drive elements being formed of a solid urethane material having a hardness measured on the Durometer A. scale in a range of between 40 and 100, said spherical drive element further having a diametrical dimension greater than that between the smooth surface of said circular portion of the drive shaft and the surface of said circular portion of the drive shaft and the opposed inner surface of the tubular driven member; and means comprising a plurality of spaced grooves of a magnitude many times smaller than the diameter of said drive elements and formed about the inner periphery of said tubular driven member for retaining each of said spherical drive elements in a position separated from the others of said drive elements, said grooves further extending along substantially the entire length of the tubular driven member opposed to said smooth shaft surface.

* * * * *